(12) United States Patent
Kaliyaperumal et al.

(10) Patent No.: US 8,797,953 B2
(45) Date of Patent: Aug. 5, 2014

(54) IN-VEHICLE NETWORKING BASED SERVICES

(75) Inventors: Ganesan Kaliyaperumal, Tamil Nadu (IN); Sri Lavanya Paleti, Andhra Pradesh (IN); Srisudha Garimella, Andhra Pradesh (IN)

(73) Assignee: Vit University (IN)

( * ) Notice: Subject to any disclaimer, the term of this patent is extended or adjusted under 35 U.S.C. 154(b) by 715 days.

(21) Appl. No.: 13/018,477

(22) Filed: Feb. 1, 2011

(65) Prior Publication Data

US 2012/0039212 A1 Feb. 16, 2012

(30) Foreign Application Priority Data

Aug. 11, 2010 (IN) .......................... 2310/CHE/2010

(51) Int. Cl.
*H04W 84/18* (2009.01)
(52) U.S. Cl.
USPC ............ 370/328; 370/338; 370/401; 709/249
(58) Field of Classification Search
None
See application file for complete search history.

(56) References Cited

U.S. PATENT DOCUMENTS

| | | | |
|---|---|---|---|
| 4,837,700 A | 6/1989 | Ando | |
| 5,003,472 A | 3/1991 | Perrill | |
| 6,434,530 B1 | 8/2002 | Sloane | |
| 6,574,603 B1 | 6/2003 | Dickson | |
| 6,856,820 B1 | 2/2005 | Kolls | |
| 6,893,347 B1 | 5/2005 | Zilliacus | |
| 8,526,350 B2 * | 9/2013 | Xue et al. ...................... | 370/312 |
| 2002/0073240 A1 * | 6/2002 | Kokkinen et al. ............. | 709/249 |
| 2002/0194498 A1 | 12/2002 | Blight | |
| 2004/0042432 A1 * | 3/2004 | Riazi et al. ..................... | 370/338 |
| 2004/0169589 A1 | 9/2004 | Lea et al. | |
| 2004/0184466 A1 * | 9/2004 | Chang et al. .................. | 370/401 |
| 2005/0036476 A1 * | 2/2005 | Eaton et al. ................... | 370/349 |
| 2005/0059414 A1 | 3/2005 | Mahmoodi | |
| 2005/0159151 A1 | 7/2005 | Eckelt | |
| 2007/0110008 A1 * | 5/2007 | Trift et al. ..................... | 370/338 |
| 2007/0217349 A1 * | 9/2007 | Fodor et al. ................ | 370/310.2 |
| 2008/0032711 A1 * | 2/2008 | Macht et al. ............... | 455/456.5 |
| 2008/0037493 A1 * | 2/2008 | Morton ......................... | 370/338 |
| 2009/0207821 A1 * | 8/2009 | Rune ............................ | 370/338 |
| 2009/0316623 A1 * | 12/2009 | Pettersson et al. ............. | 370/328 |
| 2011/0205962 A1 * | 8/2011 | Das et al. ..................... | 370/328 |
| 2011/0238864 A1 * | 9/2011 | Purzynski ..................... | 709/242 |
| 2013/0094401 A1 * | 4/2013 | MacInnis et al. ............. | 370/254 |

OTHER PUBLICATIONS

Roy Mark, "Amtrak Debuts Wireless Internet Service", InternetNews.com, Jan. 23, 2002 http://www.internetnews.com/xSP/article.php/9_959851.

(Continued)

*Primary Examiner* — Hassan Phillips
*Assistant Examiner* — Duc Duong
(74) *Attorney, Agent, or Firm* — Ren-Sheng International

(57) ABSTRACT

In accordance with embodiments of the present disclosure, a process for providing in-vehicle networking services is presented. The process may be implemented to establish a first network between a sub-management server (SMS) and a main server, wherein the SMS utilizes a first networking mechanism to communicate with the main server. The process may establish a second ad-hoc network between the SMS and a plurality of mobile devices, wherein each of the plurality of mobile devices utilizes a second networking mechanism to communicate with the SMS. The process may further transmit a first network message from the SMS to the main server, upon receiving by the SMS the first networking message from one of the plurality of mobile devices.

22 Claims, 7 Drawing Sheets

(56) References Cited

OTHER PUBLICATIONS

"Train Delay Alerts on Your Cell Phone", accessed on May 3, 2012 http://www.lapassenger.com/.

"Metrolink Alerts on your Cell Phone", accessed on May 3, 2012 http://www.lapassenger.com/about.php.

"Vehicle Bus", accessed on May 3, 2012 http://en.wikipedia.org/wiki/Vehicle_bus.

* cited by examiner

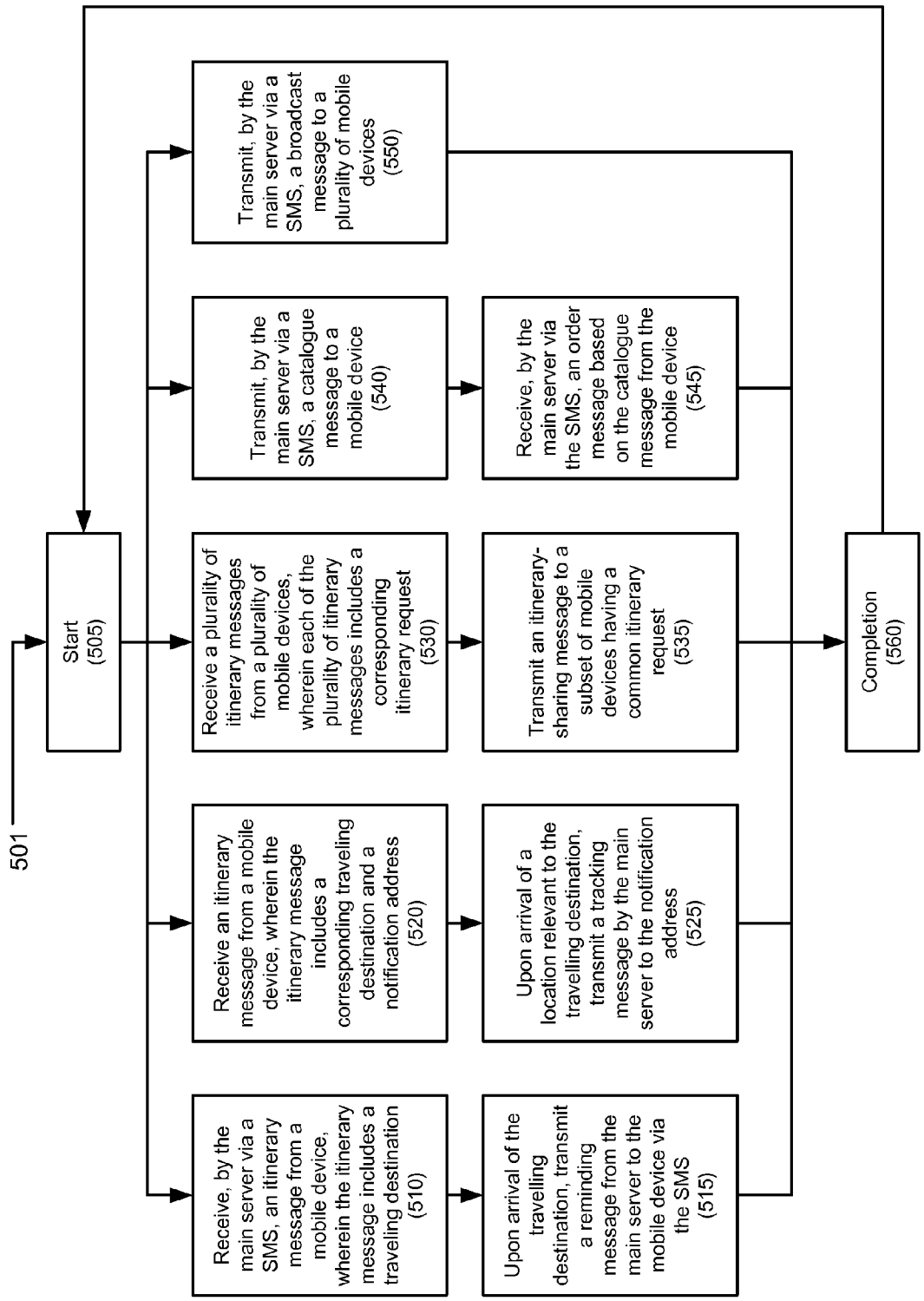

(600) A computer product (604) at least one of one or more instructions for establishing a first network between a sub-management server (SMS) and a main server, wherein the SMS utilizes a first networking mechanism to communicate with the main server establishing a second ad-hoc network between the SMS and a plurality of mobile devices, wherein each of the plurality of mobile devices utilizes a second networking mechanism to communicate with the SMS; and upon receiving by the SMS a first network message from one of the plurality of mobile devices, transmitting the first network message from the SMS to the main server

| (606) A computer-readable medium | (608) A recordable medium | (610) A communications medium |
|---|---|---|

Fig. 6

IN-VEHICLE NETWORKING BASED SERVICES

CROSS-REFERENCE TO RELATED APPLICATIONS

This application claims priority to Indian Patent Application 2310/CHE/2010, filed on Aug. 11, 2010.

BACKGROUND

Environment may greatly affect the effectiveness and the coverage of a wireless network. For example, buildings or large objects may obstruct wireless signals. When the medium that the wireless signals travelling through is polluted with noise, the quality of the wireless network suffers as well, since wireless devices may not be able to detect and distinguish the signals from the surrounding noise. In some cases, a wireless device located in a moving vehicle may have limited wireless connections to the external WIFI hot spots or mobile phone networks. The wireless device may be disconnected from all external wireless connections when the vehicle moves to a remote area or travels through a tunnel.

The wireless device located in the moving vehicle may also be affected by the travelling speed of the vehicle. For example, for a cell phone inside of a fast moving train to communicate with external wireless networks, hardware and software of the cell phone may need to take the constantly-changing cell-phone position into consideration. When the cell phone needs to switch its wireless communication from one cell broadcasting tower to another, the distance between the cell phone and the available cell broadcasting towers as well as the direction from the cell phone to each of the cell broadcasting towers may be considered for reliable cell switches.

SUMMARY

In accordance with at least some embodiments of the present disclosure, a process for providing in-vehicle networking services is presented. The process may be implemented by a system to establish a first network between a sub-management server (SMS) and a main server, wherein the SMS utilizes a first networking mechanism to communicate with the main server. The process may establish a second ad-hoc network between the SMS and a plurality of mobile devices, wherein each of the plurality of mobile devices utilizes a second networking mechanism to communicate with the SMS. The process may further, upon receiving by the SMS a first network message from one of the plurality of mobile devices, transmit the first network message from the SMS to the main server.

In accordance with other embodiments of the present disclosure, a process for utilizing in-vehicle networking services is presented. The process may be implemented by a sub-management server (SMS) to connect with a main server located in a vehicle via a first networking mechanism. The SMS may be configured to connect with a plurality of mobile devices in the vehicle via a second networking mechanism. The SMS may, upon receiving a first message from one of the plurality of mobile devices via the second networking mechanism, transmit the first message to the main server via the first networking mechanism. The SMS may further, upon receiving a second message from the main server via the first networking mechanism, transmit the second message to one of the plurality of mobile devices via the second networking mechanism.

In accordance with at least some embodiments of the present disclosure, a system is configured to provide in-vehicle networking services. The system may contain a main server located in a vehicle, wherein the vehicle contains a first vehicle compartment and a second vehicle compartment. The system may further contain a first sub-management server (SMS) and a second SMS coupled with the main server. The first SMS is located in the first vehicle compartment and the second SMS is located in the second vehicle compartment. The main server, the first SMS, and the second SMS form a first network using a first networking mechanism. The first SMS and the second SMS are configured to form, using a second networking mechanism, a second ad-hoc network and a third ad-hoc network respectively. The first SMS transmits network messages, collected from the first vehicle compartment, to the first network via the second ad-hoc network. The second SMS transmits network messages, collected from the second vehicle compartment, to the first network via the third ad-hoc network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 shows a flow diagram of an illustrative embodiment of a process for performing in-vehicle networking services;

FIG. 6 shows an illustrative embodiment of an example computer program product.

DETAILED DESCRIPTION

Figure 1:
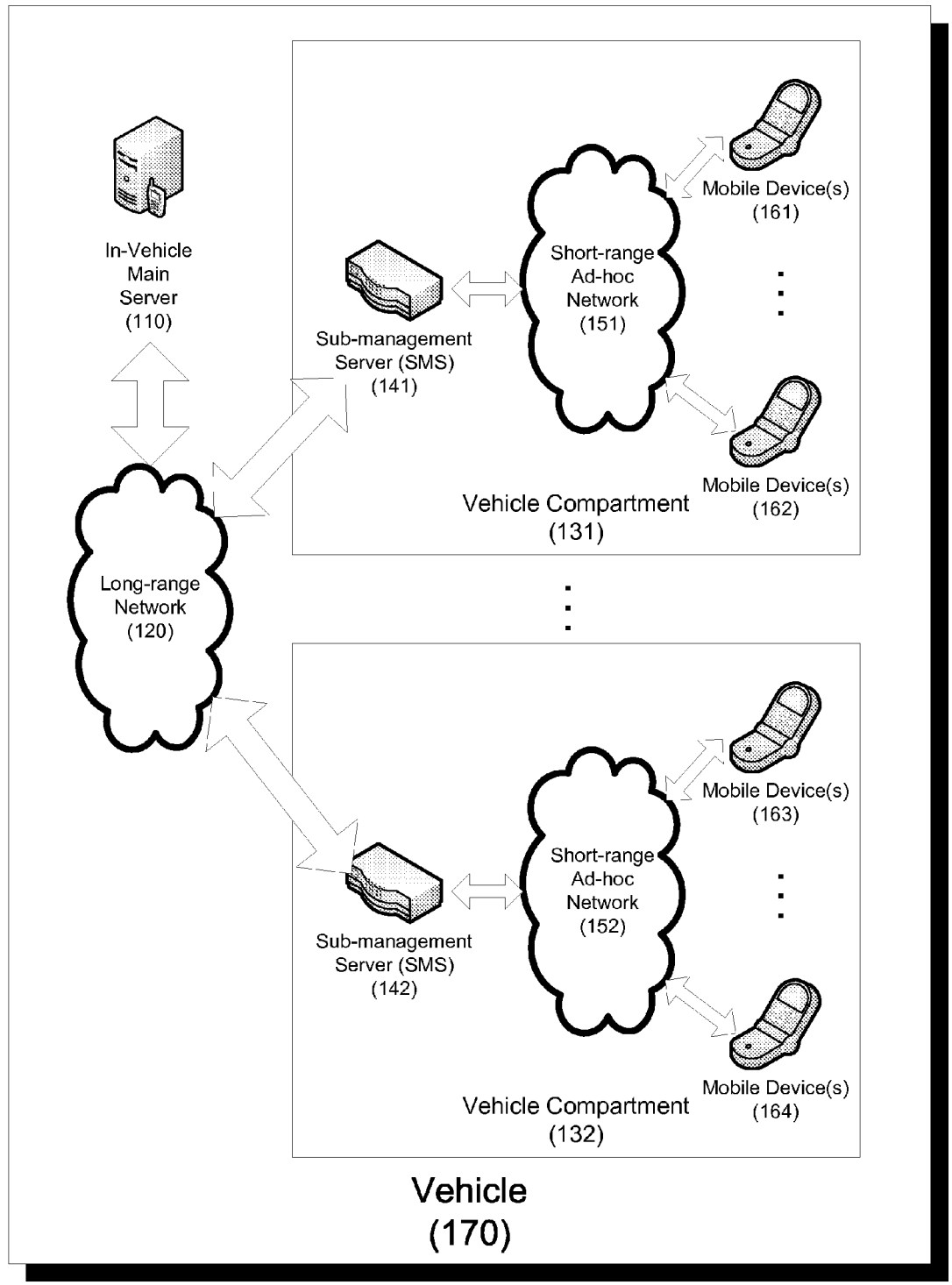
FIG. 1 shows a block diagram of an operational environment in which illustrative embodiments of an in-vehicle environment for providing in-vehicle networking services are presented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to an ad-hoc network infrastructure for providing in-vehicle networking services. In many countries, traveling by locomotive (e.g., train, ship)

may be the preferred means of transportation for long journeys. With technological advancements innovating new ways of living, lower class citizens as well as people living in rural areas are starting to have accesses to mobile devices. Taking advantage of this situation, it is ideal to provide interactive services to the passengers who have mobile devices and are traveling on locomotives, especially when Internet connectivity may not be available.

In order to provide reliable wireless network services to the mobile devices located in a fast-moving vehicle, a flexible and reliable in-vehicle networking system may be implemented to provide in-vehicle networking services to these mobile devices. The in-vehicle networking system may include a long-range network and one or more short-range ad-hoc networks. Each of the short-range ad-hoc networks may be managed by a sub-management server, providing wireless networking communications to mobile devices located in one area (e.g., one compartment) of the vehicle. The sub-management servers from different vehicle compartments may then form the long-range network with an in-vehicle main server, so that the in-vehicle networking services may be available throughout the entire vehicle. Thus, the mobile devices located in the vehicle may utilize the in-vehicle networking services without being greatly affected by the movement of the vehicle, the surrounding noise, as well as the availability of the wireless networks external to the vehicle.

Throughout the disclosure, the term "ad-hoc network" may broadly refer to a network that does not have a pre-existing infrastructure with dedicated or preconfigured network routers and/or network nodes. In an ad-hoc network, each node may be freely added or removed without affecting the connectivity of the network with respect to the already-participating nodes. In some embodiments, each node in the ad-hoc network may further participate in routing or forwarding data from/to other nodes. The determination of which nodes performing what type of networking functions may be dynamically determined as well.

Throughout the disclosure, the term "networking mechanism" may broadly refer to a specific networking technique that allows multiple network devices to communicate among each other, with or without routing. In some embodiments, a networking mechanism may be categorized as wired/wireless, long-range/short-range, or dedicated/ad-hoc. A networking mechanism may also be implemented based on a specific networking infrastructure, such as, without limitation, Ethernet, Token ring, Ad-hoc, or Mesh infrastructure. Further, a networking mechanism may utilize a specific networking protocol such as, without limitation, TCP/IP, WIFI®, BLUETOOTH®, or WIMAX®. For example, a networking mechanism may be categorized as long-range using WIFI protocol. Another networking mechanism may be implemented by a short-range BLUETOOTH protocol.

Throughout the disclosure, the term "in-vehicle networking service" may broadly refer to interactive networking service that may be accessed wirelessly by mobile devices located in a vehicle. For example, in-vehicle networking services may include, without limitation, passenger-alert service, pantry-order service, tracking service, emergency-aid service, mobile lending library service, entertainment service, and boarding and car sharing service. In some embodiments, these in-vehicle networking services may be provided by an in-vehicle main server and/or one or more sub-management servers.

FIG. 1 shows a block diagram of an operational environment, in which illustrative embodiments of an in-vehicle networking environment for providing in-vehicle networking services are presented. In FIG. 1, a vehicle 170 having multiple vehicle compartments (e.g., vehicle compartment 131 and vehicle compartment 132) may be configured with an in-vehicle main server 110. Each of the vehicle compartments 131, 132 may contain a corresponding sub-management servers 141, 142, respectively. The in-vehicle main server 110 and the sub-management servers 141, 142 may form a long-range network 120. Within each of the vehicle compartments 131, 132, multiple mobile devices, such as mobile devices 161, 162 in vehicle compartment 131 and mobile device 163, 164 in vehicle compartment 132, may communicate with their respective sub-management servers 141, 142 to form separated and distinct short-range ad-hoc networks 151, 152.

In some embodiments, the vehicle 170 may be a passenger train, a subway train, or a ship that can transport a large number of people or large amount of goods. The vehicle 170 may be configured to carry one or more vehicle compartments such as vehicle compartments 131, 132. Specifically, a vehicle compartment may be a transportation unit such as a wagon, a truck, or a passenger carriage of a train. A vehicle compartment may also be a deck section or a floor of a ship. When one vehicle compartment is disconnected with a vehicle and connected with a different vehicle (e.g., passenger carriage 132 is disconnected from a train 170 and connected with a different train), the sub-management server 142 of the disconnected vehicle compartment 132 may also be disconnected from the long-range network 120, and connected with a different long-range network managed by an in-vehicle main server of the different vehicle. Thus, even in places that have no external wireless connections, the long-range network 120 as well as the short-range ad-hoc networks 151, 152 may allow the mobile devices 161, 162, 163, 164 to use the in-vehicle networking services provided by the in-vehicle main server 110 as well as the sub-management servers 141, 142 anywhere inside or near the moving vehicle 170.

In some embodiments, each of the mobile devices 161, 162, 163, 164 may be configured to communicate with other applications and/or devices in a network environment. Taking the mobile device 161 as an example for different embodiments of the mobile devices, the mobile device 161 may be, without limitation, a Personal Digital Assistant (PDA), cell phone, smart-phone, and/or any mobile internet device. The mobile device 161 may support various mobile telecommunication standards such as, without limitation, Global System for Mobile communication (GSM), Code Division Multiple Access (CDMA), Time Division Multiple Access (TDMA), General Packet Radio Service (GPRS), EDGE, WIFI, or BLUETOOTH. Some other examples of the mobile device 161 may include, without limitation, a conventional personal computer (PC), tablet computer, laptop computer, and netbook, each of which having wired or wireless communication adapter. For example, the mobile device 161 may be a laptop computer having a BLUETOOTH communication adapter capable of communicating using BLUETOOTH protocol.

In some embodiments, the sub-management servers (hereinafter "SMS") 141, 142 may be computing and/or networking devices that are capable of communicating in multiple networking protocols. Taking the SMS 141 as an example for different embodiments of the SMSs, the SMS 141 may detect the existence of mobile devices 161, 162, and construct a short-range ad-hoc network 151. The SMS 141 may communicate with the mobile devices 161, 162 to provide some of the in-vehicle networking services. Further, the SMS 141 may perform data transmissions to relay network messages between the mobile devices 161, 162 and the in-vehicle main server 110. In some embodiments, each of the vehicle compartments 131, 132 may contain a corresponding SMS 141 or SMS 142 responsible for detecting and communicating with the mobile devices that are present in its vehicle compartment. For example, SMS 141 may be responsible for detecting and communicating with mobile devices 161 and/or 162, and SMS 142 may be responsible for detecting and communicating with mobile devices 163 and/or 164. In some embodiments, the SMS 141 may be a dedicated pre-programmed device, while the mobile devices 161 and 162 may not be required to install any pre-programmed applications in order for them to communicate with the SMS 141.

In some embodiments, the SMS 141 may form a short-range ad-hoc network 151 among itself and the mobile devices 161 and 162. The short-range ad-hoc network 151 may select a networking mechanism that may provide network coverage to the compatible mobile devices in a vehicle compartment. For example, the short-range ad-hoc network 151 may be implemented by BLUETOOTH protocol, which may provide network coverage to an area that is within a 10 to 100-meter radius from a SMS. Multiple SMSs may be distributed to all vehicle compartments to guarantee short-range wireless network coverage throughout the whole vehicle 170. Likewise, multiple SMSs may also be placed inside of a single vehicle compartment to ensure adequate network coverage. When a mobile device can reach two or more SMSs (e.g., having a same or similar distance to multiple SMSs), the mobile device may select one of the multiple SMSs as its SMS for further services. The details of the short-range ad-hoc network are further described below.

In some embodiments, the SMSs positioned throughout the vehicle 170 (e.g., SMS 141, SMS 142) may be connected with an in-vehicle main server 110 to form a long-range wired/wireless network 120. Thus, the SMSs 141, 142 may be configured to utilize at least two networking mechanisms, one networking mechanism for communicating in the short-range ad-hoc networks 151, 152, and another networking mechanism for communicating in the long-range network 120. In some embodiments, the two networking mechanisms may or may not be compatible. As a result, the mobile devices 161, 162, 163, 164, which may use a specific networking mechanism to communicate with their respective SMSs, may not be able to directly communicate with the in-vehicle main server 110 using the same networking mechanism, and may rely on the SMSs 141, 142 for such tasks.

In some embodiments, the long-range network 120 may be, without limitation, a wireless network, such as a wireless local area network (WLAN). The long-range network 120 may also be a wired network, such as, without limitation, local area network (LAN), Fibre Channel fabric, or any combination of such interconnects. Network communications, such as HTTP requests/responses, Wireless Application Protocol (WAP) messages, or any type of standard or proprietary network messages can be transmitted among the various devices connected to the long-range network 120. In some embodiments, the term "long-range" may broadly refer to a communication distance that is longer than the range covered by the short-range ad-hoc networks 151, 152. For example, the short-range ad-hoc network 151, 152 may cover an area of a vehicle compartment, while the long-range network 120 may cover the whole train or ship.

In some embodiments, the in-vehicle main server 110 may be a computer server that is placed anywhere inside of the vehicle 170. The in-vehicle main server 110 may provide in-vehicle networking services in the fields of, without limitation, email, web page browsing, audio/video streaming/ playing, digital picture/video capturing, online chatting, gaming. Some examples of the in-vehicle networking services may include, without limitation, passenger-alert service, pantry-order service, tracking service, emergency-aid service, mobile lending library service, entertainment services, and boarding and car-sharing service. During operation, the mobile devices 161, 162, 163, 164 may communicate with the in-vehicle main server 110 via the SMSs 141, 142. In some embodiments, the vehicle 170 may be in motion, and may not have connections to any wired/wireless network external to the vehicle 170. Thus, the short-range ad-hoc network 151, 152 may provide the above in-vehicle services to the mobile devices 161, 162, 163, 164 inside the vehicle 170.

In some embodiments, the in-vehicle main server 110, the SMSs 141, 142, and the mobile devices 161, 162, 163, 164 may contain computing processors and computing memories (not shown in FIG. 1). The computing processor may control the operations of these devices in implementing some of the embodiments illustrated herein. The computing processor may utilize a computing memory to store data. Additional components not shown in FIG. 1, such as network communication adapters (e.g., Ethernet adapter, wireless adapter, Fibre Channel adapter, WIFI or BLUETOOTH wireless adapters) may also be implemented in these devices, accordingly. The details of the processors and memories are further described below.

Figure 2:
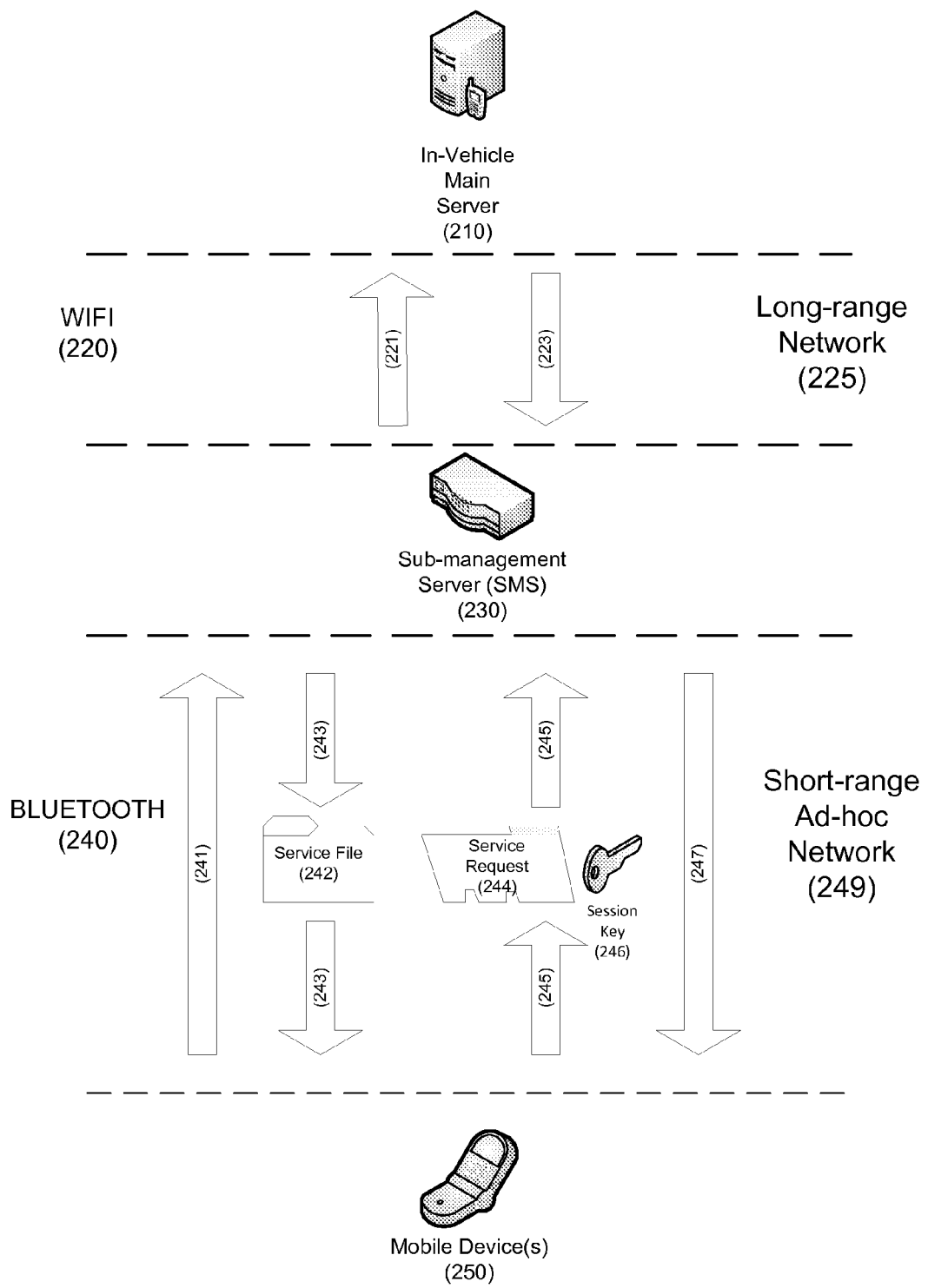
FIG. 2 shows an illustrative embodiment of a network configuration that may be utilized for providing in-vehicle networking services.

FIG. 2 shows an illustrative embodiment of a network configuration that may be utilized for providing in-vehicle networking services in a vehicle. In FIG. 2, an in-vehicle main server 210 may be connected with a SMS 230 to form a long-range network 225. The SMS 230 may be connected with a mobile device 250 to form a short-range ad-hoc network 249. The in-vehicle main server 210 may be similar to the in-vehicle main server 110 of FIG. 1; the SMS 230 may be similar to the SMS 141 or SMS 142 of FIG. 1; and the mobile device 250 may be similar to the mobile devices 161, 162, 163, or 164 of FIG. 1. Likewise, the long-range network 225 may be similar to the long-range network 120 of FIG. 1; and the short-range ad-hoc network 249 may be similar to the short-range ad-hoc network 151 or 152 of FIG. 1.

In some embodiments, the long-range network 225 may be established by installing and configuring the in-vehicle main server 210 and the SMS 230 in the vehicle. The long-range network 225 may be implemented by a wireless networking mechanism, so that no physical wiring is necessary in the vehicle compartments in order to enable the in-vehicle main server 210 to communicate with the SMS 230. In some embodiments, WIFI may be a suitable wireless networking mechanism for implementing the long-range network 225, since its range may be extended by routing and may adequately cover the whole vehicle, and it performs adequately when the vehicle is in motion. Alternatively, other networking mechanisms, such as a wired LAN, may be selected to implement the long-range network 225 as long as their performance are satisfactory inside a fast moving vehicle.

In some embodiments, the mobile device 250 may be located in a vehicle compartment of the vehicle, and may seek to connect to the short-range ad-hoc network 249. The short-range ad-hoc network 249 may be constructed and managed by a SMS 230 dedicated for serving a corresponding vehicle compartment. Alternatively, the short-range ad-hoc network 249 may be formed by multiple mobile devices 250, having one of the mobile devices acting as the SMS 230. In this case, the mobile device acting as the SMS 230 may communicate in at least two networking mechanisms, one serving the short-range ad-hoc network 249, and the other serving the long range network 225.

In some embodiments, the mobile device 250 may participate in the short-range ad-hoc network 249 by allowing itself to be discoverable. The SMS 230, which may be continuously searching for mobile devices that can be added to the ad-hoc network 249, may discover (241) the mobile device 250 and include the mobile device 250 into the short-range ad-hoc network 249. Alternatively, the SMS 230 may be configured to be discoverable, allowing the mobile device 250 to locate the SMS 230 and join in the ad-hoc network 249. Once the mobile device 250 becomes a part of the ad-hoc network 249, it may be able to transmit and receive network messages to/from the SMS 230. This may be achieved by loading a service file on the mobile device 250, which may enable communication with the SMS 230.

In some embodiments, the SMS 230 may push (243) a service file 242 to the newly discovered mobile device 250. Alternatively, once joined into the ad-hoc network 249, the mobile device 250 may pull (243) the service file 242 from the SMS 230 by first sending a network message 241 to the SMS 230 requesting for the service file 242. Upon receiving such a request, the SMS 230 may then respond to the network message by sending the service file 242 to the mobile device 250. The service file 242 may act as an interface and a communication link between the SMS 230 and the mobile device 250. The service file 242 may be executed on the mobile device 250 to display in-vehicle networking services, and to accept client inputs associated with the utilizations of these in-vehicle networking services. In some embodiments, the service file 242 may be a hand-held-device (HDD) interface file that may be executed on the mobile device 250. Once executed on the mobile device 250, the service file 242 may accept client inputs, establish connection with the SMS 230, and transmit the client inputs to the SMS 230.

In some embodiments, the service file 242 may be in a form similar to a HTML page downloaded from a web site, regardless whether there is Internet connection that can be accessed by the mobile device 250. Downloading the service file 242 from the SMS 230 and executing the service file 242 at the mobile device 250 may be similar to accessing a web site from a web browsing application. Thus, the in-vehicle main server 210 and/or the SMS 230 may act as a web server, and the mobile device 250 may contain a web browsing application for displaying and executing the service file 242. Further, web-based code such as JAVA® or JAVASCRIPT® may also be included in the service file 242 to deliver the in-vehicle networking services provided by the in-vehicle main server 210 and/or the SMS 230. To enhance the performance of the in-vehicle networking services, rather than being sent from the in-vehicle main server 210, the service file 242 may be cached in the SMS 230 for fast delivery to the mobile device 250.

In some embodiments, after the service file 242 is pushed to the mobile device 250, the mobile device 250 may stop further network communications with the SMS 230, until the mobile device 250 is ready for using the in-vehicle networking services. For example, the names and descriptions of the in-vehicle networking services may be delivered to the mobile device 250 via the service file 242. When the mobile device 250 is used for browsing the names of the in-vehicle networking services, no further network communications may be required between the SMS 230 and the mobile device 250. Later, when the mobile device 250 invokes (245) a specific in-vehicle networking service, the mobile device 250 may transmit a service request 244 and/or a session key 246 to the SMS 230. The SMS 230 may then identify the mobile device 250 based on the session key 246, determine that the mobile device 250 has previously been registered in the short-range ad-hoc network 249, and allow the mobile device 250 to invoke and utilize the specific in-vehicle networking service identified by the service request 244. The service request 244 may contain the necessary information that are provided by the mobile device 250, and can be used by the identified in-vehicle networking service.

In some embodiments, the session key 246 may be a device-specific unique key that may be permanent effective, or temporary with a fixed effective time period. The session key 246 may be generated by executing the service file 242 on the mobile device 250. The session key generation may embed hardware identification, which can uniquely identify the mobile device 250, into the session key 246. Further, the session key 246 may include specific information to inform the SMS 230 that the downloading of the service file 242 has been accomplished on the mobile device 250. Subsequently, when initiating an in-vehicle networking service, the mobile device 250 may transmit another network message 241 that contains the session key 246 to the SMS 230. The SMS 230 may then evaluate the session key 246 to extract the hardware identification of the mobile device 250, as well as to ascertain whether the mobile device 250 has previously registered in the short-range ad-hoc network 249.

In some embodiments, since the long-range network 225 is separated from the short-range ad-hoc network 249, the SMS 230 may receive the network message 245 via the short-range ad-hoc network 249, and forward the network message 245 as message 221 to the in-vehicle main server 210 via the long-range network 225. Upon receiving a message 223 in response to the message 221 from the in-vehicle main server 210 via the long-range network 225, the SMS 230 may convert the response message 223 as a network message 247, and send the network message 247 to the corresponding mobile device 250 via the short-range ad-hoc network 249.

In some embodiments, the long-range network 225 may utilize WIFI as its networking mechanism, and the short-range ad-hoc network 249 may use BLUETOOTH as its networking mechanism. In this case, the SMS 230 may have the capability to communicate in both WIFI 220 and BLUETOOTH 240. Thus, the SMS 230 may utilize WIFI 220 networking mechanism to transmit/receive network messages 221 and 223, and utilize BLUETOOTH 240 to transmit/receive network messages 241, 243, 245 and 247. By implementing such a two-tier network infrastructure, the mobile device 250 may be enabled to use a short-range networking mechanism to communicate long-range with the in-vehicle main server 210, the SMSs, and mobile devices in other vehicle compartments.

Figure 3:
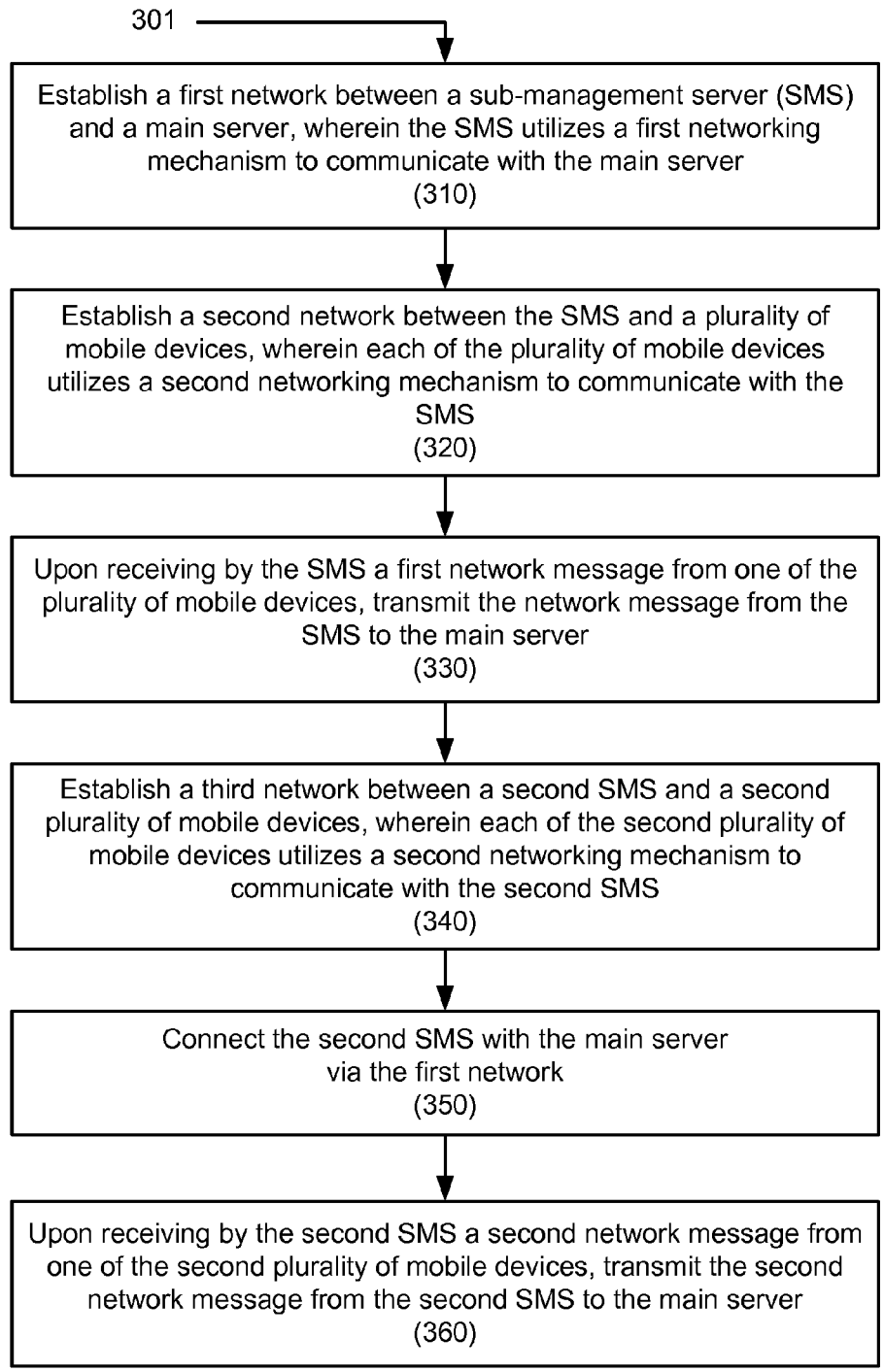
FIG. 3 shows a flow diagram of an illustrative embodiment of a process for providing in-vehicle networking services via multiple networks.

FIG. 3 shows a flow diagram of an illustrative embodiment of a process 301 for providing in-vehicle networking services via multiple networks. The process 301 may include one or more operations, functions, or actions as illustrated by blocks 310, 320, 330, 340, 350, and/or 360, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 301 may be stored in memory, executed by a processor, and/or implemented in mobile devices, SMSs, and/or the in-vehicle main server 110 of FIG. 1.

Process 301 may begin at block 310, "establish a first network between a SMS and a main server, wherein the SMS utilizes a first networking mechanism to communicate with the main server." Block 310 may be followed by block 320, "establish a second network between the SMS and a plurality of mobile devices, wherein each of the plurality of mobile devices utilizes a second networking mechanism to communicate with the SMS." Block 320 may be followed by block 330, "upon receiving by the SMS a first network message from one of the plurality of mobile devices, transmit the network message from the SMS to the main server." Block 330 may be followed by block 340, "establish a third network between a second SMS and a second plurality of mobile devices, wherein each of the second plurality of mobile devices utilizes a second networking mechanism to communicate with the second SMS." Block 340 may be following by block 350, "connect the second SMS with the main server via the first network." And the block 350 may be followed by block 360, "upon receiving by the second SMS a second network message from one of the second plurality of mobile devices, transmit the second network message from the second SMS to the main server."

At block 310 (establish a first network), a SMS may establish a first network between the SMS and an in-vehicle main server. More than one SMS may be connected with the in-vehicle main server via the first network, utilizing a first networking mechanism. In some embodiments, the first networking mechanism may be implemented by a networking mechanism (e.g. WIFI) that has a range that may cover a large area. It is advantageous to choose WIFI as a long-range networking mechanism since it may supply wireless coverage to the whole vehicle.

At block 320 (establish a second network), the SMS may establish a second network with a plurality of mobile devices. The second network may be an ad-hoc network, in which each of the mobile devices utilizes a second networking mechanism to communicate with the SMS. In some embodiments, the second networking mechanism may be implemented with a short-range BLUETOOTH protocol. Thus, the SMS and the mobile devices are BLUETOOTH enabled, allowing them to be connected to the second network utilizing the BLUETOOTH's discovering, authenticating, and connecting mechanisms. Selecting BLUETOOTH as the short-range networking mechanism may have the advantages of low energy consumption, easy implementation, and reliable wireless communication for the mobile devices located in a vehicle compartment.

At block 330 (transmit the first network message from SMS to the main server), the SMS may receive a first "network message" from one or more mobile devices connected via the second network. In some embodiments, upon receiving the first network message from one of the mobile devices, the SMS may process the first network message, which is received via the second networking mechanism (e.g., BLUETOOTH), into a format that may be transmitted via the first networking mechanism (e.g., WIFI). In other words, after being received by the SMS, the first network message may be transmitted to the main server through the first network using the first networking mechanism. Thus, the SMS may act as a router in between two separate networks, relaying the network messages between the in-vehicle main server and the mobile devices.

In some embodiments, the SMS may collect multiple first "network messages" received from the mobile devices during a predetermined amount of time, concatenate the multiple first network messages into a single message that can be delivered via the first networking mechanism, and transmit the single message to the in-vehicle main server in a single network communication session. Upon receiving the single message, the in-vehicle main server may extract the multiple first network messages from the single message, and process each of the multiple first network messages, either sequentially or concurrently. Such an approach may allow the main server to process more network messages while utilizing less network communication sessions.

At block 340 (establish a third network), a second SMS may establish a third network with a second plurality of mobile devices. The second SMS and the second plurality of mobile devices may be located at another vehicle compartment that is different from the vehicle compartment in which the SMS and the plurality of mobile devices of the block 310 are contained. The third network may utilize the second networking mechanism (e.g., BLUETOOTH), similar to the block 310. Thus, the second network and the third network may coexist at the same time, while located at different vehicle compartments. Further, the second and the third networks, with their corresponding SMSs, may be dedicated to serve the mobile devices that are present in their respective vehicle compartments.

At block 350 (connect the second SMS with the main server), the second SMS of the block 340 may be connected with the main server via the first network. In some embodiments, SMSs from different vehicle compartments may be linked to the main server via the same network (e.g., the first network), allowing them to utilize the same first networking mechanism (e.g., WIFI) to communicate among each other. Thus, each of the SMSs may not only communicate directly with the main server, but also the SMSs located at other vehicle compartments.

At block 360 (transmit the second network message), the second SMS may receive a second "network message" from one of the second plurality of mobile devices. In other words, comparing to the first network message, which is transmitted and received at a vehicle compartment, the second SMS independently receive the second network message at a different vehicle compartment. The second network message may be transmitted and received via the third network utilizing the second networking mechanism. Similar to block 330, the second SMS may relay the second network message to the main server via the first network utilizing the first networking mechanism (e.g., WIFI). Thus, within a vehicle such as a train, there may be one "first network" connecting the main server with multiple SMSs, each of the multiple SMSs may serve a corresponding vehicle compartment of the train. Within each vehicle compartment, there may be an independent "second network" connecting the SMS for the vehicle compartment with the mobile devices within the same vehicle compartment.

Figure 4:
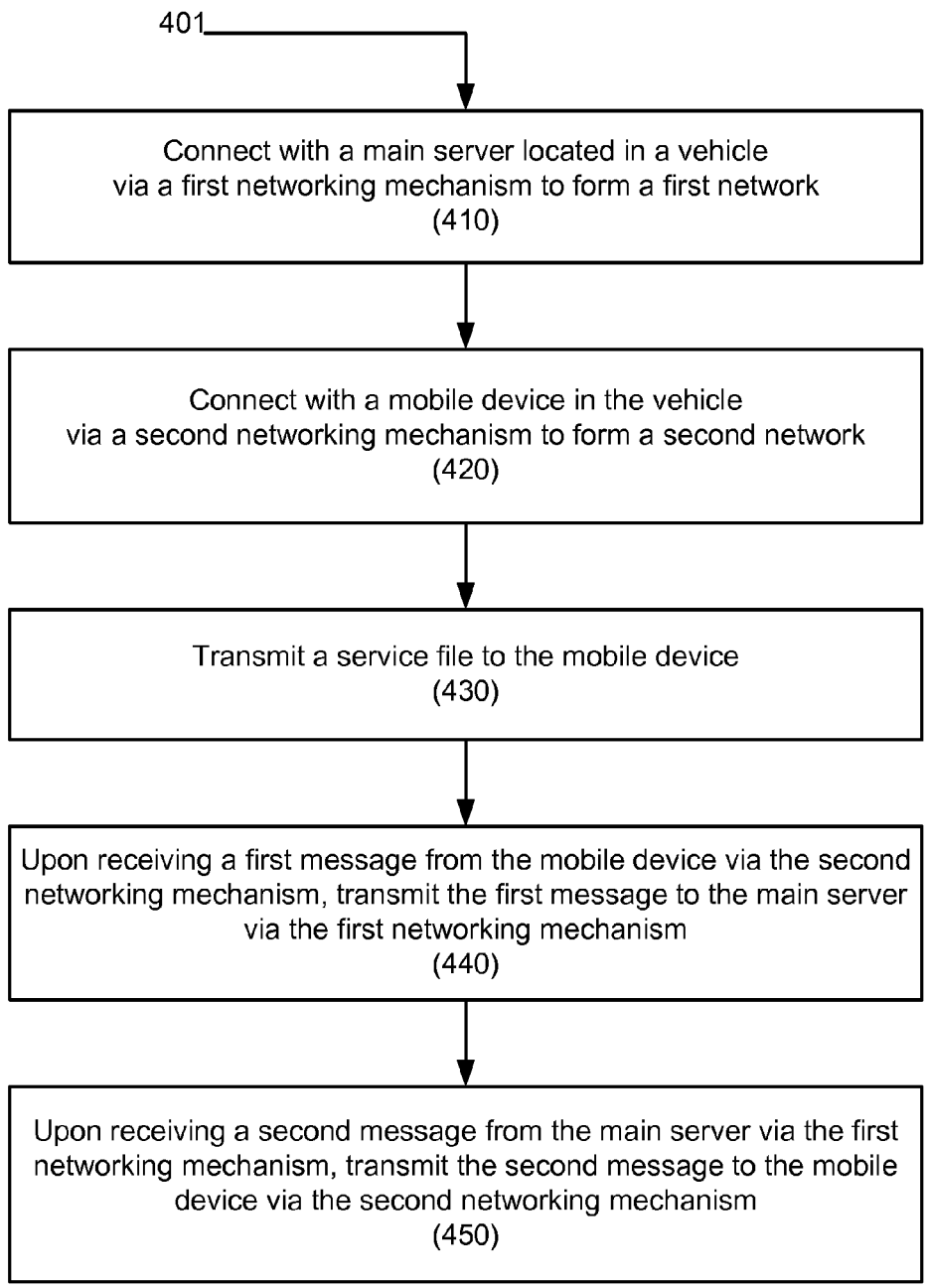
FIG. 4 shows a flow diagram of an illustrative embodiment of a process for providing in-vehicle networking services via a Sub Management Server (SMS) connecting two networks.

FIG. 4 shows a flow diagram of an illustrative embodiment of a process 401 for providing in-vehicle networking services via a SMS connecting two networks. The process 401 may include one or more operations, functions, or actions as illustrated by blocks 410, 420, 430, 440, and/or 450, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 401 may be stored in memory, executed by a processor, and/or implemented in a mobile device, a SMS, and/or an in-vehicle main server of FIG. 1.

Process 401 may begin at block 410, "connect with a main server located in a vehicle via a first networking mechanism to form a first network." Block 410 may be followed by block 420, "connect with a mobile device in the vehicle via a second networking mechanism to form a second network." Block 420 may be followed by block 430, "transmit a service file to the mobile device." Block 430 may be following by block 440, "upon receiving a first message from the mobile device via the second networking mechanism, transmit the first message to the main server via the first networking mechanism." And the block 440 may be followed by block 450, "upon receiving a second message from the main server via the first networking mechanism, transmit the second message to the mobile device via the second networking mechanism."

At block 410 (connect with a main server), a SMS may be connected with a main server via a first networking mechanism. In some embodiments, the SMS may be connected to a first network via a wired or wireless connection. The SMS may be located in one of the compartments of a moving vehicle. The first network may provide network coverage that spans the whole vehicle. Thus, the first network may be formed by one main server located in the vehicle, plus multiple SMSs each of which is located at a corresponding vehicle compartment of the vehicle.

At block 420 (connect with a mobile device), the SMS may be connected with a mobile device located within the same vehicle compartment as the SMS does. In some embodiments, the SMS and one or more mobile devices may form a short-range ad-hoc wireless network using a short-range networking mechanism such as BLUETOOTH. The mobile device may be dynamically connected and disconnected from the second network. For example, by using BLUETOOTH's discovering scheme, the SMS may locate the BLUETOOTH-enabled mobile device that is within the BLUETOOTH's operational range, and seek to connect the mobile device to the second network. Alternatively, the BLUETOOTH mobile device may perform similar locating operation to discover and connect to the SMS close by.

At block 430 (transmit a service file), the SMS may transmit a predefined or dynamically-generated service file to the mobile device via the second networking mechanism. The service file, as described above, may be executed on the mobile device and enable the mobile device to use the in-vehicle networking services. At block 440 (transmit the first message), the SMS may receive a first message from the mobile device requesting for accessing an in-vehicle networking service. The first message may be received via the second network using the second networking mechanism. The SMS may then transmit the first message to the main server using the first networking mechanism, which is utilized for implementing the first network. In some embodiments, the SMS may collect multiple messages from the mobile device and/or additional mobile devices on the second network, concatenate the multiple messages into a single message for the first network, and transmit the single message to the main server utilizing the first networking mechanism.

At block 450 (transmit the second message), the SMS may receive a second message from the main server via the first mechanism. The second message, which may be the response message to the first message, may include information related to the in-vehicle networking services. Upon receiving the second message from the main server, the SMS may transmit the second message to the mobile device, using the second networking mechanism via the second network. Thus, by repeating block 440 and block 450, the SMS may act as a communication router in between two distinct and separate networks (the first network and the second network). Further, the SMS may allow the mobile device and the main server to communicate between each other, using two different networking mechanisms.

FIG. 5 shows a flow diagram of an illustrative embodiment of a process 501 for performing in-vehicle networking services. The process 501 may include one or more operations, functions, or actions as illustrated by blocks 505, 510, 515, 520, 525, 530, 535, 540, 545, 550, and/or 560, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 501 may be stored in memory, executed by a processor, and/or implemented in a mobile device, a SMS, or an in-vehicle main server of FIG. 1.

Process 501 may begin at block 505, "start." Blocks 505 may be followed by blocks 510, 520, 530, 540, or 550, depending on which in-vehicle networking service may be activated by a mobile device. Block 510 may be performed for "receive, by the main server via a SMS, an itinerary message from a mobile device, wherein the itinerary message includes a traveling destination." Block 510 may be followed by block 515, "upon arrival of the travelling destination, transmit a reminding message from the main server to the mobile device via the SMS." Block 520 may be performed for "receive an itinerary message from a mobile device, wherein the itinerary message includes a corresponding traveling destination and a notification address." Block 520 may be followed by block 525, "upon arrival of a location relevant to the traveling destination, transmit a tracking message by the main server to the notification address."

Block 530 may be performed for "receive a plurality of itinerary messages from a plurality of mobile devices, wherein each of the plurality of itinerary message includes a corresponding itinerary request." Block 530 may be followed by block 535, "transmit an itinerary-sharing message to a subset of mobile devices having a common itinerary request." Block 540 may be performed for "transmit, by the main server via a SMS, a catalogue message to a mobile device." Block 540 may be following by block 545, "receive, by the main server via the SMS, an order message based on the catalogue message from the mobile device." Block 550 may be performed for "transmit, by the main server via a SMS, a broadcast message to a plurality of mobile devices." Blocks 515, 525, 535, 545, and 550 may proceed to block 560 for Completion. And block 560 may proceed to block 505.

At block 510 (receive an itinerary message with a travelling destination), an in-vehicle main server may receive an itinerary message from a mobile device. In some embodiments, the itinerary message may be received via a SMS located at the same vehicle compartment as the mobile device. The itinerary message may include a traveling destination for a vehicle passenger. For example, the traveling destination may be a train station that the vehicle will stop by. The itinerary message may include additional information such as, without limitation, the passenger's mobile phone number and/or berth number. More than one mobile device may submit their respective itinerary messages to the main server. The main server may sort these received itinerary messages based on their respective traveling destinations.

At block 515 (transmit a reminding message), upon the arrival of a travelling destination, the main server may transmit a reminding message to any of the mobile devices that submitted an itinerary message and have the arriving travelling destination in the itinerary message. Thus, the reminding message may serve as an advance notice to the mobile devices informing that the travelling destination is coming up soon. In some embodiments, the reminding message may be transmitted within a short period (e.g., 15 minutes) before the arrival at the travelling destination. The reminding message may be an audio tone ringing or a text message which alerts the passenger the arrival of the destination.

At block 520 (receive an itinerary message with a travelling destination and a notification address), the in-vehicle main server may receive an itinerary message from a mobile device. The itinerary message may be received in a similar fashion as in block 510. In some embodiments, the itinerary message may include a travelling destination and a reminding address. The reminding address may be an email address or a telephone number corresponding to the mobile device of a friend or relative who cares for the passenger. Similar to block 510, more than one mobile device may submit their respective itinerary messages to the main server.

At block 525 (transmit a tracking message), the main server may transmit a tracking message upon the arrival at a particular location relevant to the traveling destination. Any one of the locations on the traveling path, as well as the traveling destination itself, may be deemed a location relevant to the traveling destination. For each itinerary message that identifies the same travelling destination, the tracking message may be transmitted based on the notification address within the itinerary message, informing the arrival to such travelling destination. In some embodiments, the main server may be connected with a network external to the vehicle when the vehicle is approaching the travelling destination or the relevant location. For example, the main server may be connected to the wireless network which may become available near a station. Based on the notification address, the main server may send the notification message via an email to an email address, a text message to a telephone number, or via an automatic call to the telephone number. If the Internet connection is not available, but the mobile phone service is available, the mail server may skip sending the email notification, and send the text message via mobile phone service instead.

At block 530 (receive a plurality of itinerary messages), the main server may receive a plurality of itinerary messages (collected within a predetermined period of time) from a plurality of mobile devices via their respective SMSs. Each of the itinerary messages may include a corresponding itinerary request. The itinerary request may indicate a particular interest associated with a travelling destination. For example, the itinerary request may indicate an interest in lodging or cab sharing at a destination. The main server may process these itinerary messages based on the travelling destination and the itinerary request associated with each message, and try to match the requests based on common travelling destinations and/or the itinerary requests.

In some embodiments, the SMSs, rather than the main server, may try to match the requests based on the vehicle compartments the requests are originated from. For example, a SMS may received the plurality of itinerary messages from the specific vehicle compartment the SMS is located. By evaluating the itinerary requests in these itinerary messages, the SMS may match the requests that have similar destination and from the passengers of the same sex. If the matches are found, the SMS may perform the subsequent operation without forwarding the itinerary requests to the main server or other SMSs. If no matches are found within the specific vehicle compartment, the SMS may transmit the itinerary messages to the neighboring compartments' SMSs and/or the main server. Likewise, the SMS may also receive similar itinerary messages from the neighboring compartments' SMS. Based on the itinerary requests from the other vehicle compartments collected within a predetermined time period, the SMS may perform similar operations to identify matching requests.

At block 535 (transmit an itinerary-sharing message), the main server may transmit an itinerary-sharing message to a subset of mobile devices that have matching itinerary requests. The itinerary-sharing message may include identity information of the subset of mobile devices, which share a common interest in sharing lodge or cab and have a common itinerary request. This subset of mobile devices may be selected from the plurality of mobile devices. Based on the identity information in the itinerary-sharing message, the subset of mobile devices may further communicate among themselves to share their respective contact information and further discuss how to arrange for the details of the lodge or cab sharing.

At block 540 (transmit a catalogue message), the main server may transmit a catalogue message to a mobile device. In some embodiments, the transmission may be in response to a request sent by the mobile device. The catalogue message may contain a list of services that are available for usage. For example, the catalogue message may include a pantry menu for food ordering, a book library for borrowing books, or a multimedia list for downloading. At block 545 (receive an order message), the main server may receive an order message from the mobile device. The order message may also include the mobile device's identifier as well as the vehicle compartment the mobile device is located at. Further, the order message may include an order of a particular service. For example, the order message may specify the food, book, or the multimedia file. Based on the order message, the service may then be performed accordingly.

At block 550 (transmit a broadcast message), the main server may transmit a broadcast message to all the mobile devices that may be reached by their respective SMSs. The broadcast message may be an emergency message seeking a doctor's assistance. The broadcast message may also be general status information related to the vehicle's travelling speed, current position, as well as the weather information at the destination. In some embodiments, the SMSs in the vehicle may first collect doctor information via its service file, store the doctor information in the SMS, and forward such information to other SMSs and the main server. During emergency, the SMSs may also broadcast the doctor information to their respective vehicle compartments.

At block 560 (completion), a communication session may be deemed completed between the main server and one or more mobile devices. Afterward, the process 501 may proceed to 505, waiting for further requests for the in-vehicle networking services. In some embodiments, upon the completion of a session, the mobile device may disconnect from its respective short-range ad-hoc network, in order to conserve mobile device power. Once the mobile device is ready for additional requests, it may reconnect to the short-range network, and one of the blocks of 510, 520, 530, 540, and/or 550 may be activated from block 505.

In some embodiments, upon receiving a service message from a mobile device, the main server and/or the SMS that serves the mobile device may provide a media stream to the mobile device. In some embodiments, the media stream could be very small and stored in the local SMS rather than transmitting from the main server to the SMS. The media stream may contain audio, video, and/or games such as Flash that could be played on the mobile device.

FIG. 6 shows an illustrative embodiment of an example computer program product 600. Program product 600 may include one or more machine-readable instructions 604, which, if executed by one or more processors, may operatively enable a computing device to provide the functionality described above. Thus, for example, referring to the system of FIG. 1, the mobile device, the SMS, and the in-vehicle main server may undertake one or more of the operations shown in at least FIG. 4, FIG. 5 or FIG. 6 in response to instructions 604.

In some implementations, the program product 600 may encompass a computer-readable medium 606, such as, but not limited to, a hard disk drive, a Compact Disc (CD), a Digital Versatile Disk (DVD), a digital tape, memory, etc. In some implementations, a recordable medium 608 may encompass mediums, such as, but not limited to, memory, read/write (R/W) CDs, RAN DVDs, etc. In some implementations, the program product 600 may encompass a communications medium 610, such as, but not limited to, a digital and/or an analog communication medium (e.g., a fiber optic cable, a wired communications link, a wireless communication link, etc.).

Figure 7:
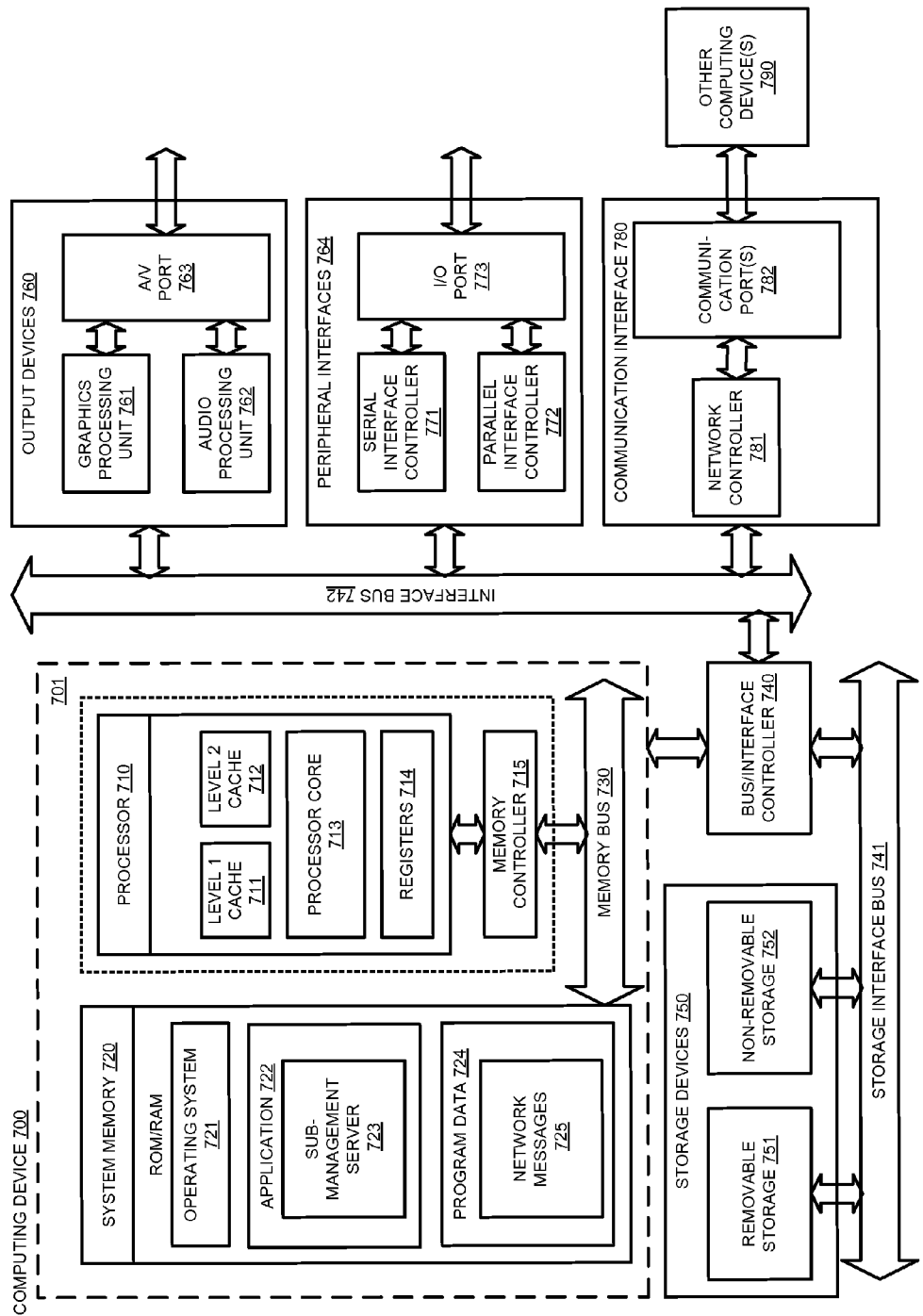
FIG. 7 shows a block diagram of an illustrative embodiment of an example computing device.

FIG. 7 shows a block diagram of an illustrative embodiment of an example computing device 700. In a very basic configuration 701, computing device 700 may include one or more processors 710 and a system memory 720. A memory bus 730 may be used for communicating between the processor 710 and the system memory 720.

Depending on the desired configuration, processor 710 may be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include a sub-management server 723 that is arranged to perform the functions and/or operations as described herein including at least the functional blocks and/or operations described with respect to process 401 of FIG. 4 and process 501 of FIG. 5. Program Data 724 may include network messages 725 for use by the SMS 723. In some example embodiments, application 722 may be arranged to operate with program data 724 on an operating system 721 such that implementations of mobile application quality-of-service determination may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output interfaces 760 may include a graphics processing unit 761 and an audio processing unit 762, which may be configured to communicate to various external devices such as a display or speakers via one or more A/V ports 763. Example peripheral interfaces 760 may include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 700 may also be implemented as a personal computer including both laptop computer and non-laptop computer configurations. In addition, computing device 700 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for providing in-vehicle networking services, comprising:
    establishing a first network between a sub-management server (SMS) and a main server, wherein the SMS utilizes a first networking mechanism to communicate with the main server;
    establishing a second ad-hoc network between the SMS and a plurality of mobile devices, wherein each of the plurality of mobile devices utilizes a second networking mechanism to communicate with the SMS;
    in response to receipt by the SMS a first network message from one of the plurality of mobile devices, transmitting the first network message from the SMS to the main server;
    establishing a third ad-hoc network between a second SMS and a second plurality of mobile devices, wherein each of the second plurality of mobile devices utilizes the second networking mechanism to communicate with the second SMS;
    connecting the second SMS with the main server via the first network; and
    in response to receipt by the second SMS a second network message from one of the second plurality of mobile devices, transmitting the second network message from the second SMS to the main server.

2. The method as recited in claim 1, wherein the first networking mechanism utilizes a WIFI protocol.

3. The method as recited in claim 1, wherein the second networking mechanism utilizes a BLUETOOTH protocol.

4. The method as recited in claim 1, further comprising:
    receiving, by the main server via the SMS, an itinerary message from a mobile device selected from the plurality of mobile devices, wherein the itinerary message includes a traveling destination; and
    in response to arrival of the traveling destination, transmitting a reminding message by the main server to the mobile device via the SMS.

5. The method as recited in claim 1, further comprises:
    transmitting, by the main server via the SMS, a catalogue message to a mobile device selected from the plurality of mobile devices; and
    receiving, by the main server via the SMS, an order message based on the catalogue message from the mobile device.

6. The method as recited in claim 1, further comprises:
    receiving, by the main server via the SMS, an itinerary message from a mobile device located in a vehicle, wherein the mobile device is selected from the plurality of mobile devices, and the itinerary message includes a traveling destination and a notification address; and
    in response to arrival of a location relevant to the traveling destination and a determination that the mobile device is located in the vehicle, transmitting a tracking message by the main server to the notification address indicating the mobile device arriving at the location.

7. The method as recited in claim 1, further comprising:
    in response to receipt of a request from a mobile device selected from the plurality of mobile devices, transmitting a media stream to the mobile device.

8. The method as recited in claim 1, further comprising:
    receiving a plurality of itinerary messages from the plurality of mobile devices, wherein each of the messages includes a corresponding itinerary request; and
    transmitting an itinerary-sharing message to a subset of mobile devices having corresponding itinerary requests matched, wherein the subset of mobile devices are selected from the plurality of mobile devices that submit the plurality of itinerary messages.

9. The method as recited in claim 1, further comprising:
    transmitting a broadcasting message by the main server via the SMS to each of the plurality of mobile devices.

10. The method as recited in claim 1, wherein the method is embodied in a non-transitory machine-readable medium as a set of instructions which, when executed by a computing processor, cause the computing processor to perform the method.

11. A method for utilizing in-vehicle networking services, comprising:
    connecting with a main server located in a vehicle via a first networking mechanism;
    connecting with a plurality of mobile devices in the vehicle via a second networking mechanism;
    in response to receipt of a first message from one of the plurality of mobile devices via the second networking mechanism, transmitting the first message to the main server via the first networking mechanism;
    in response to receipt of a second message from the main server via the first networking mechanism, transmitting the second message to one of the plurality of mobile devices via the second networking mechanism;

in response to receipt of a registration message from a mobile device selected from the plurality of mobile devices, transmitting a service file to the mobile device;

generating a session key for the mobile device;

receiving a service request message from the mobile device, wherein the service request message contains the session key; and determining the identity of the mobile device by evaluating the session key in the service request message.

12. The method as recited in claim 11, further comprising:
receiving a plurality of messages from the plurality of mobile devices via the second networking mechanism;
concatenating the plurality of messages into a concatenated message; and
transmitting the concatenated message to the main server via the first networking mechanism, wherein the main server extracts the plurality of messages from the concatenated message and processes the plurality of messages.

13. The method as recited in claim 11, further comprising:
in response to receipt of a broadcasting message from the main server via the first networking mechanism, transmitting the broadcasting message to each of the plurality of mobile devices via the second networking mechanism.

14. The method as recited in claim 11, wherein the plurality of mobile devices cannot directly communicate with the main server via the first networking mechanism or the second networking mechanism.

15. The method as recited in claim 11, wherein the first networking mechanism uses a longer range wireless protocol than the second networking mechanism.

16. A system configured to provide in-vehicle networking services, comprising:
a main server located in a vehicle, wherein the vehicle contains a first vehicle compartment and a second vehicle compartment; and
a first sub-management server (SMS) and a second SMS coupled with the main server, wherein
the first SMS is located in the first vehicle compartment and the second SMS is located in the second vehicle compartment,
the main server, the first SMS, and the second SMS form a first network using a first networking mechanism,
the first SMS and the second SMS are configured to form, using a second networking mechanism, a second ad-hoc network and a third ad-hoc network, respectively,
the first SMS transmits network messages, collected from the first vehicle compartment, to the first network via the second ad-hoc network, and
the second SMS transmits network messages, collected from the second vehicle compartment, to the first network via the third ad-hoc network.

17. The system as recited in claim 16, further comprising:
a plurality of mobile devices connected with the first SMS via the second ad-hoc network, wherein the first SMS receives network messages from the plurality of mobile devices via the second ad-hoc network using the second networking mechanism, and transmits the network messages to the main server via the first network using the first networking mechanism.

18. The system as recited in claim 16, wherein the vehicle is in motion.

19. A method for providing in-vehicle networking services, comprising:
establishing a first network between a sub-management server (SMS) and a main server, wherein the SMS utilizes a first networking mechanism to communicate with the main server;
establishing a second ad-hoc network between the SMS and a plurality of mobile devices, wherein each of the plurality of mobile devices utilizes a second networking mechanism to communicate with the SMS;
in response to receipt by the SMS a first network message from one of the plurality of mobile devices, transmitting the first network message from the SMS to the main server;
receiving, by the main server via the SMS, an itinerary message from a mobile device selected from the plurality of mobile devices, wherein the itinerary message includes a traveling destination; and
in response to arrival of the traveling destination, transmitting a reminding message by the main server to the mobile device via the SMS.

20. A method for providing in-vehicle networking services, comprising:
establishing a first network between a sub-management server (SMS) and a main server, wherein the SMS utilizes a first networking mechanism to communicate with the main server;
establishing a second ad-hoc network between the SMS and a plurality of mobile devices, wherein each of the plurality of mobile devices utilizes a second networking mechanism to communicate with the SMS;
in response to receipt by the SMS a first network message from one of the plurality of mobile devices, transmitting the first network message from the SMS to the main server;
transmitting, by the main server via the SMS, a catalogue message to a mobile device selected from the plurality of mobile devices; and
receiving, by the main server via the SMS, an order message based on the catalogue message from the mobile device.

21. A method for providing in-vehicle networking services, comprising:
establishing a first network between a sub-management server (SMS) and a main server, wherein the SMS utilizes a first networking mechanism to communicate with the main server;
establishing a second ad-hoc network between the SMS and a plurality of mobile devices, wherein each of the plurality of mobile devices utilizes a second networking mechanism to communicate with the SMS;
in response to receipt by the SMS a first network message from one of the plurality of mobile devices, transmitting the first network message from the SMS to the main server;
receiving, by the main server via the SMS, an itinerary message from a mobile device located in a vehicle, wherein the mobile device is selected from the plurality of mobile devices, and the itinerary message includes a traveling destination and a notification address; and
in response to arrival of a location relevant to the traveling destination and a determination that the mobile device is located in the vehicle, transmitting a tracking message by the main server to the notification address indicating the mobile device arriving at the location.

22. A method for providing in-vehicle networking services, comprising:

establishing a first network between a sub-management server (SMS) and a main server, wherein the SMS utilizes a first networking mechanism to communicate with the main server;

establishing a second ad-hoc network between the SMS and a plurality of mobile devices, wherein each of the plurality of mobile devices utilizes a second networking mechanism to communicate with the SMS;

in response to receipt by the SMS a first network message from one of the plurality of mobile devices, transmitting the first network message from the SMS to the main server;

receiving a plurality of itinerary messages from the plurality of mobile devices, wherein each of the messages includes a corresponding itinerary request; and transmitting an itinerary-sharing message to a subset of mobile devices having corresponding itinerary requests matched, wherein the subset of mobile devices are selected from the plurality of mobile devices that submit the plurality of itinerary messages.

* * * * *

UNITED STATES PATENT AND TRADEMARK OFFICE
CERTIFICATE OF CORRECTION

PATENT NO. : 8,797,953 B2
APPLICATION NO. : 13/018477
DATED : August 5, 2014
INVENTOR(S) : Kaliyaperumal et al.

It is certified that error appears in the above-identified patent and that said Letters Patent is hereby corrected as shown below:

On the Title Page, item (73), under "Assignee", in Column 1, Line 1, delete "Vit University (IN)" and insert -- Vit University, Tamil Nadu, (IN) --, therefor.

Signed and Sealed this
Fifteenth Day of September, 2015

Michelle K. Lee
*Director of the United States Patent and Trademark Office*